United States Patent
Bel et al.

(10) Patent No.: US 10,471,891 B2
(45) Date of Patent: Nov. 12, 2019

(54) INTERIOR LIGHTING SYSTEM FOR AN AUTONOMOUS MOTOR VEHICLE

(71) Applicant: VALEO VISION, Bobigny (FR)

(72) Inventors: Romain Bel, Bobigny (FR); Thibaud Barillot, Bobigny (FR)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 15/718,676

(22) Filed: Sep. 28, 2017

(65) Prior Publication Data
US 2018/0086259 A1 Mar. 29, 2018

(30) Foreign Application Priority Data

Sep. 28, 2016 (FR) ...................................... 16 59202

(51) Int. Cl.
| | | |
|---|---|---|
| *B60Q 3/74* | (2017.01) | |
| *B60Q 3/80* | (2017.01) | |
| *B60Q 3/60* | (2017.01) | |
| *H05B 37/02* | (2006.01) | |
| *B60Q 3/16* | (2017.01) | |

(52) U.S. Cl.
CPC ............... *B60Q 3/80* (2017.02); *B60Q 3/16* (2017.02); *B60Q 3/60* (2017.02); *B60Q 3/74* (2017.02); *H05B 37/0227* (2013.01); *H05B 37/0236* (2013.01)

(58) Field of Classification Search
CPC ... B60Q 3/16; B60Q 3/80; B60Q 3/60; B60Q 3/74; H60K 35/00; H05B 37/0227; H05B 37/0236; B60K 2350/962
See application file for complete search history.

(56) References Cited

U.S. PATENT DOCUMENTS

| | | | |
|---|---|---|---|
| 2012/0140126 A1* | 6/2012 | Werth ................ | B60R 11/0235 348/837 |
| 2014/0214260 A1* | 7/2014 | Eckert .................... | B60Q 1/488 701/28 |
| 2015/0094896 A1 | 4/2015 | Cuddihy et al. | |

(Continued)

FOREIGN PATENT DOCUMENTS

| | | |
|---|---|---|
| DE | 10 2013 006 793 A1 | 10/2014 |
| DE | 10 2015 110 903 A1 | 1/2016 |

(Continued)

OTHER PUBLICATIONS

French Preliminary Search Report dated Jun. 19, 2017 in French Application 16 59202 filed on Sep. 28, 2016 (with English Translation of Categories of Cited Documents).

*Primary Examiner* — Wei (Victor) Y Chan
*Assistant Examiner* — Henry Luong
(74) *Attorney, Agent, or Firm* — Oblon, McClelland, Maier & Neustadt, L.L.P.

(57) ABSTRACT

An interior lighting system for an autonomous motor vehicle includes at least one autonomous driving module and an interior lighting luminous device comprising a plurality of luminous sub-assemblies. Each luminous sub-assembly is configured in an interior lighting static mode or in an interior lighting dynamic mode. At least one luminous assembly is configured to pass from the static mode to the dynamic mode, and vice versa, as a function of at least one autonomous driving control parameter from said driving module.

20 Claims, 2 Drawing Sheets

(56) References Cited

U.S. PATENT DOCUMENTS

| | | | |
|---|---|---|---|
| 2015/0094897 A1* | 4/2015 | Cuddihy | B60R 11/0229 |
| | | | 701/23 |
| 2016/0009291 A1* | 1/2016 | Pallett | B60W 50/082 |
| | | | 701/23 |
| 2016/0185387 A1* | 6/2016 | Kuoch | B60K 35/00 |
| | | | 701/41 |
| 2016/0251016 A1 | 9/2016 | Pallett et al. | |
| 2017/0120804 A1* | 5/2017 | Kentley | G05D 1/0088 |

FOREIGN PATENT DOCUMENTS

| | | |
|---|---|---|
| DE | 10 2015 008 666 A1 | 3/2016 |
| DE | 10 2015 101 234 A1 | 7/2016 |
| KR | 20090024853 A * | 3/2009 |
| KR | 20090024853 A * | 3/2009 |
| WO | WO 2015/014964 A1 | 2/2015 |

\* cited by examiner

INTERIOR LIGHTING SYSTEM FOR AN AUTONOMOUS MOTOR VEHICLE

The present invention relates to an interior lighting system for an autonomous motor vehicle as well as a motor vehicle comprising such a system.

Motor vehicles provided with autonomous driving functions permit the action of the driver of such a vehicle to be entirely replaced by acting on the control commands of the vehicle, such as in particular the management of the speed of the vehicle and the steering thereof. Generally, within the context of the present invention the autonomous vehicle makes it possible to take control of all of the driving actions, from the start-up to the stoppage of the motor vehicle.

From now on, the driver, who no longer has to be concerned with monitoring the road, is able to shift his attention to activities other than driving. In particular, it is conceivable that it is possible for the driver of such an autonomous vehicle no longer to focus his attention on the road and, for example, to turn round completely toward the rear seats. Thus it may be desired by the driver to provide a specific lighting ambience to the passenger compartment which is different from the filtered and neutral light imposed by a manual driving situation.

The present invention falls within this context and aims to propose means for implementing interior lighting which is adapted to the wishes of a user of an autonomous vehicle.

According to the invention, the interior lighting system for an autonomous motor vehicle comprises at least one autonomous driving module and an interior lighting luminous device comprising a plurality of luminous sub-assemblies, each luminous sub-assembly being configured in an interior lighting static mode or in an interior lighting dynamic mode, at least one luminous assembly being configured to pass from the static mode to the dynamic mode, and vice versa, as a function of at least one autonomous driving control parameter from said driving module.

"Autonomous driving control parameter" is understood to encompass the parameters from a control module of an autonomous driver's cockpit, i.e. a control module which is configured to detect and analyse the events which appear on the road and which is configured to provide autonomous control commands to the associated actuators as a function of prior detection and analysis.

A parameter from a control module may, for example, be a driving state, namely if the vehicle is in autonomous driving mode or manual driving mode, or a warning of an upcoming situation, for example if an urgent situation involves the driver having to take up the steering wheel by hand.

In particular, according to the invention it is possible to control the triggering of a dynamic projection, i.e. a light signal which varies in intensity and/or in color as a function of the risk of interference to the driver. If the vehicle is in autonomous mode, there is no risk of causing interference to the driver and thus the light signal may vary, whilst if a driver is at the steering wheel and manages the control of the vehicle, it is appropriate that a possible dynamic light signal is not visible to the driver in order not to attract his attention and to distract him from the road.

According to further features of the invention, taken individually or in combination, it is possible to provide that:

each luminous sub-assembly is controlled by a control module which is configured to receive a parameter from an autonomous driving module and to define an interior lighting dynamic mode, or an interior lighting static mode, of the corresponding luminous sub-assembly;

at least one luminous sub-assembly is configured, in a dynamic mode, to diffuse an ambient light, the intensity and/or the color and/or the orientation thereof varying as a function of a control command relative to an audible element; "control command relative to an audible element" is understood to mean that the control module is configured to receive information from at least one sound sensor arranged in the passenger compartment of the vehicle, the control module being configured to vary the intensity and/or the color of the light signal which it controls as a function of the volume and the frequency of the sound detected;

at least one luminous sub-assembly is configured, in a dynamic mode, to diffuse an ambient light, the intensity and/or the color and/or the orientation thereof varying as a function of a control command relative to a visual element; "control command relative to a visual element" is understood to means that the control module is configured to receive information from at least one means of image acquisition which may, in particular, be turned toward the outside of the vehicle, the control module being configured to project an image in relation to the image detected outside; in particular the control module could project an image of a beach in sunshine when an urban landscape in the rain is detected;

at least one luminous sub-assembly is controlled automatically as a function of detecting information received by the control module;

at least one luminous sub-assembly is controlled by the action of a manual control;

at least one luminous sub-assembly comprises one or more light sources and at least one optical element for forming beams;

the at least one optical element is configured to produce a rear projection;

the at least one optical element is a transparent or translucent glazed surface configured to emit light;

the at least one optical element is positioned on the dashboard;

the light source(s) and the at least one optical element of the at least one luminous sub-assembly form part of a pico projector;

the at least one optical element is a means of diverting beams onto a projection surface;

the projection surface is arranged on a different structural element of the passenger compartment from the surface from where the luminous sub-assembly emits light; by way of example, the luminous sub-assembly could be installed in the region of the roof of the vehicle and emit light rays toward a lateral glazed surface;

at least one first luminous sub-assembly is arranged at the front of the passenger compartment and in that at least one second luminous sub-assembly is arranged at the rear of the passenger compartment; "front and rear of the passenger compartment" is understood to mean the zones arranged on either side of a plane passing through the backrests of the front seats;

the first sub-assembly or sub-assemblies may be controlled independently of the second sub-assembly or sub-assemblies.

The invention also relates to a method for interior lighting of an autonomous motor vehicle, characterized in that it comprises the steps of selecting a lighting mode, selecting a lighting zone, collecting information on the status of the vehicle in autonomous or manual driving and configuring the luminous means associated with the lighting zone as a function of the lighting mode and of the driving mode.

Thus the invention aims to protect that fact that the lighting ambience, i.e. the interior lighting dynamic mode, may be deactivated when the driver is in manual mode.

For an autonomous motor vehicle comprising at least one first luminous sub-assembly arranged at the front of the passenger compartment and at least one second luminous sub-assembly arranged at the rear of the passenger compartment, the method according to the invention may be such that when all of the luminous sub-assemblies are in interior lighting dynamic mode, the first luminous sub-assemblies remain activated in dynamic mode after receiving a parameter according to which the vehicle is in manual drive or after receiving a parameter according to which the driver has to take up the steering wheel following a detection of an urgent situation or event not stored in the control module, the second sub-assemblies being in turn controlled so as to be activated in static mode.

Further features and advantages of the present invention will appear more clearly by means of the description and the drawings, in which.

Figure 3:
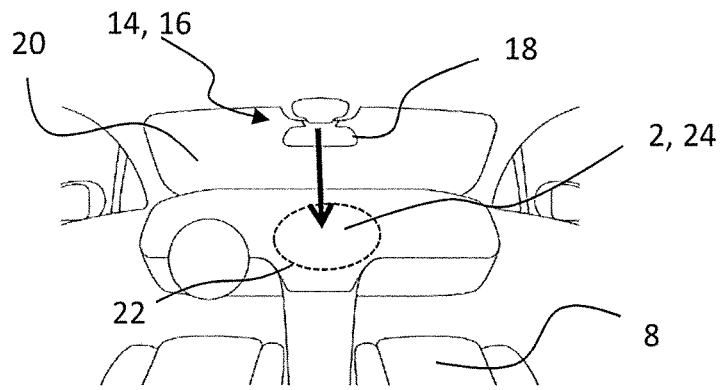
Figure 4:
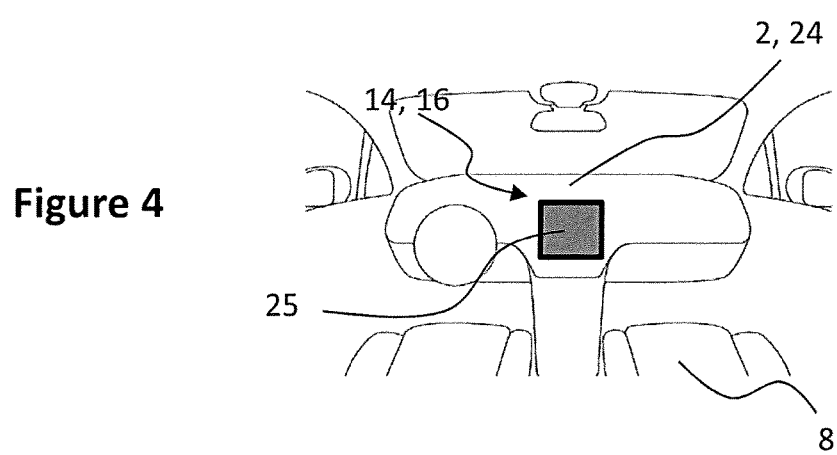
Figure 5:
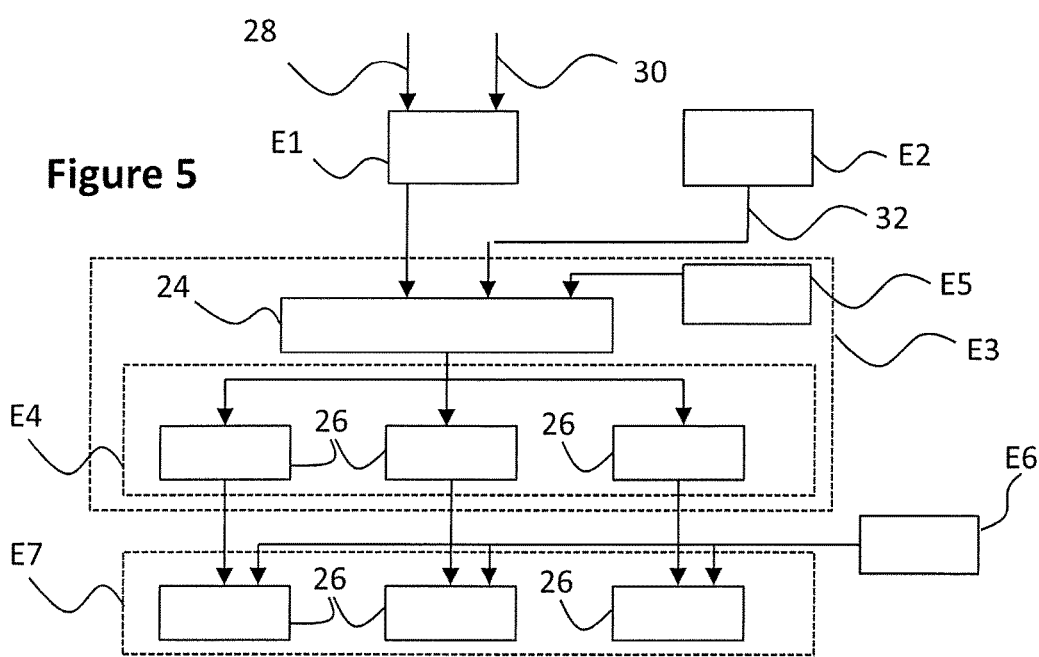

FIGS. 3 and 4 are views of the interior passenger compartment of a motor vehicle equipped with an interior lighting system according to the invention, showing the front seats and the dashboard and a luminous sub-assembly functioning as a projection onto a glazed surface at a distance (FIG. 3) or functioning as a rear projection onto a transparent or translucent surface of the structural element on which the luminous sub-assembly is fitted (FIG. 4); and FIG. 5 is a organigram showing a method for interior lighting of a motor vehicle according to the invention.

In the remainder of the document, the terms "front" and "rear" are taken as referring to the front and the rear of a motor vehicle, according to its normal direction of travel.

Figure 1:
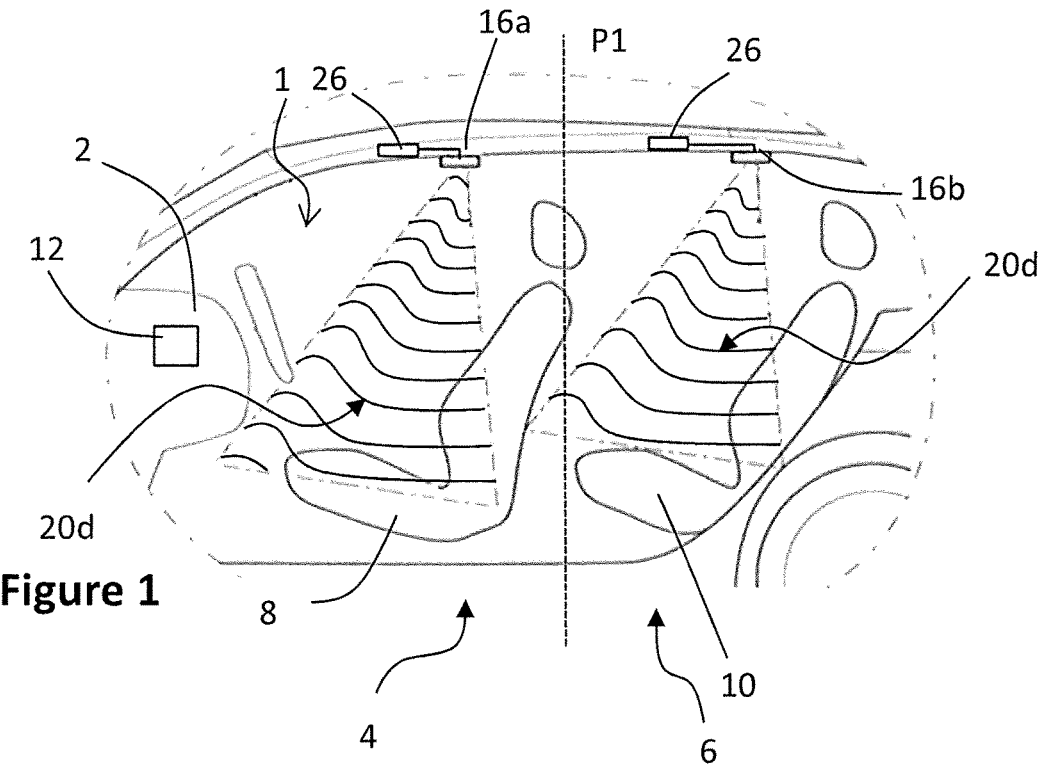
FIG. 1 is a lateral sectional view of a passenger compartment of a motor vehicle illustrating an interior lighting system according to the invention in a first configuration.
Figure 2:
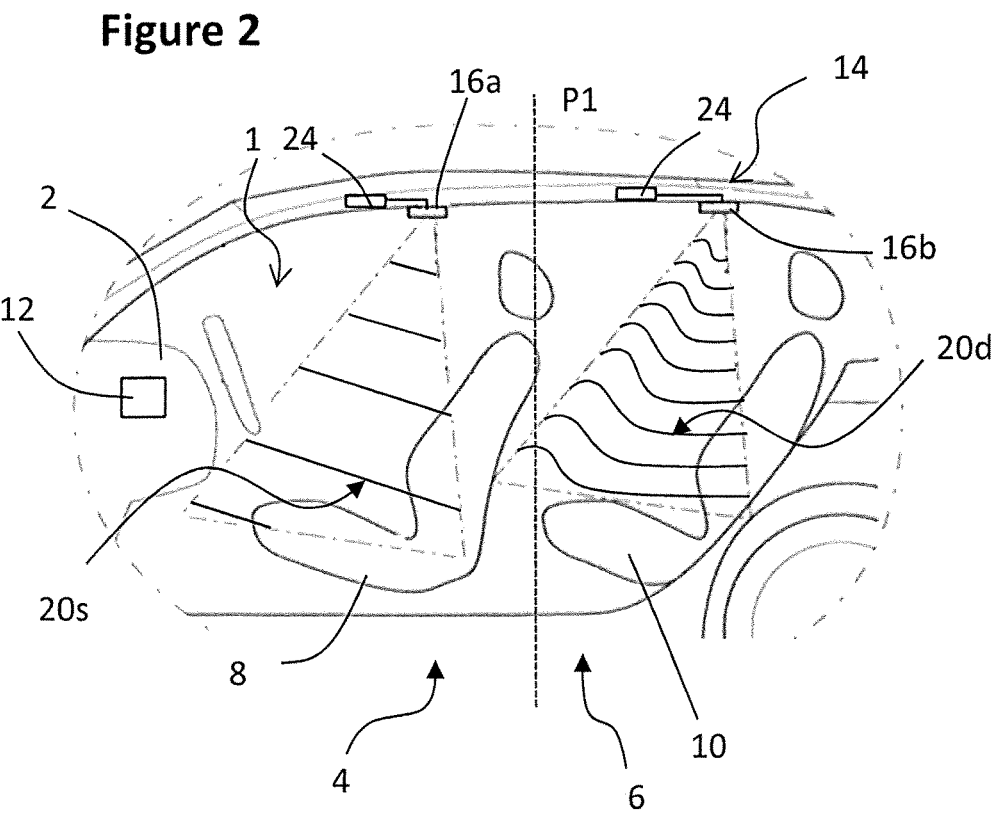
FIG. 2 is a view similar to that of FIG. 1 with the interior lighting system according to the invention in a second configuration.

A passenger compartment of an autonomous motor vehicle 1 which comprises in this case a driver's cockpit 2 arranged in a front part 4 of the passenger compartment has been illustrated in FIGS. 1 and 2.

The passenger compartment is separated between this front part 4 and a rear part 6, the front part comprising in particular the two front seats 8, the driver's seat thereof which is arranged opposite the driver's cockpit, and the rear part comprising in particular the rear seats or bench 10.

It is possible to define a separation between these two zones as the plane P1 passing through the backrest of the front seats or, if the front seats are offset relative to one another, as the plane perpendicular to the longitudinal axis of the vehicle passing through the backrest of the driver.

It is thus understood that when the driver is at the steering wheel and observes the road in front of the vehicle, what happens in the rear part of the passenger compartment is not visible to the driver.

The autonomous vehicle comprises an autonomous driving module 12 which in this case is housed in the driver's cockpit 2 and which is configured to define the driving controls to be implemented automatically in place of the driver when the safety conditions are respected. This autonomous driving module is configured to generate status information 13 on the configuration of the vehicle or an autonomous driving control parameter, i.e. information relative to the operation or stoppage of the autonomous mode.

The autonomous vehicle comprises an interior lighting system which comprises at least this autonomous driving module 12 and an interior lighting luminous device 14.

An interior lighting luminous device 14 comprises a plurality of luminous sub-assemblies 16. Each sub-assembly comprises at least one light source and an associated optical device which is configured to form the emitted light signal.

As illustrated in FIG. 3, a luminous sub-assembly may comprise components which are configured to create a front projection device, i.e. a device installed in a structural element of the vehicle, in this case a central rearview mirror 18, and configured to project a beam 20 onto a projection zone 22 arranged at a distance from this structural element.

As illustrated in FIG. 4, a luminous sub-assembly may comprise components which are configured to create a rear projection device, i.e. a luminous device integrated in a structural element of the vehicle, in this case the dashboard 24, and configured to illuminate a surface 25 with refractive, transparent or translucent properties, and via which the beams emitted by the light source are oriented toward the passenger compartment.

One or more first sub-assemblies 16a are configured to emit a light beam into the front part 4 of the passenger compartment, whilst one or more second sub-assemblies 16b are configured to emit a light beam into the rear part 6.

A positioning of a first luminous sub-assembly 16a in the front part 4 of the passenger compartment and a second luminous sub-assembly 16b in the rear part 6 of the passenger compartment has been illustrated schematically in FIGS. 1 and 2.

Each luminous sub-assembly 16 is configured to emit according to an interior lighting dynamic mode or according to an interior lighting static mode, the interior lighting dynamic mode consisting of light signals of variable color and/or intensity and/or orientation and to this end each luminous sub-assembly 16 is controlled by a specific control module 26 which generates control commands for controlling the light source and/or the optical device.

By way of example, and as will be disclosed below in more detail, in relation to the method for interior lighting according to the invention, it is possible to provide that in a first step, as illustrated in FIG. 1, the first and the second luminous sub-assemblies are controlled so as to generate a dynamic light signal, modeled in the figure by a beam 20d with undulating lines, whilst in a second step, as illustrated in FIG. 2, the first luminous sub-assembly 16a arranged in the vicinity of the driver, in this case perpendicular thereto, is controlled so as to generate a static light signal, modeled in the figure by a beam 20s with straight lines, and the second luminous sub-assembly 16b arranged at the rear of the vehicle continues to emit a dynamic light signal 20d.

The dynamic interior lighting or ambient lighting, ideally produced by lighting systems as multi-colored LEDs of the RGB type, for example, positioned at various locations of the passenger compartment, could be configured in terms of color, luminosity and contrast by the occupant himself or in a more autonomous manner, such as for example in a manner synchronized with music. It could be possible to provide the presence of one or more LEDs, possibly of different colors, or white LEDs or LEDs of the RGB type or any other type of light source.

The ambient lighting is dynamic as a function of a sound, in particular music and/or as a function of an image, and in particular an image of a landscape outside the vehicle.

The dynamism of the interior lighting may be of the type originally generated by detecting a specific sound, for example by means of a sound sensor. Such a sensor is configured to detect the sound present in the passenger compartment of the vehicle and, if required, to detect the sound emitted by a mobile reading device, by connecting to an appropriate connector.

The dynamic lighting mode is triggered automatically once music is detected in the passenger compartment, or even as a result of manual control. In each case, the lighting of a part of the passenger compartment in a dynamic mode or static mode is controlled as a function of the activation or not of the autonomous driving mode.

More specifically, according to the invention the condition for implementing this dynamic lighting, at least for the front part of the vehicle, is that the vehicle is in an autonomous driving mode.

The luminous sub-assemblies distributed in the passenger compartment may be controlled independently according to whether they are associated with the front part or the rear part of the passenger compartment.

It is thus possible, on the one hand, to consider different ambiences at the front and at the rear of the passenger compartment, from lighting positioned in the region of the overhead lights, the door panels, or any other location in the passenger compartment.

It is possible, on the other hand, when the vehicle returns to manual mode to deactivate the ambient lighting only in the part of the vehicle which the driver has in his field of vision in order to permit the driver to keep control of the vehicle and the rear passengers to continue to benefit from the interior lighting dynamic mode.

The implementation of the interior lighting system according to the invention will now be described in more detail by referring to the organigram of FIG. 5, a method for interior lighting being implemented by way of example in the following manner.

In a first step E1, a dynamic or static lighting mode is selected, in particular according to the invention. As has been able to be specified above, the interior lighting static mode corresponds to a lighting mode in which the light sources are fixed and provide a constant light signal whilst the dynamic lighting mode corresponds to a lighting mode in which the light signal emitted varies over time, without the intervention of the user.

More particularly, in this first selection step E1, a dynamic lighting mode is triggered. This first selection step of the lighting mode may be implemented by an automatic action 28, for example at the start-up of the vehicle or even manually by an action 30 of a user on one or more control buttons arranged in the passenger compartment.

The dynamic lighting mode starts as soon as the first selection step is operated and the conditions for triggering are detected, for example as soon as there is a result from an audio detection step E2, i.e. the detection of a succession of sounds confirming the presence of music in the passenger compartment.

In the example disclosed, it is the detection of information 32 relative to the presence of music which triggers the lighting process E3 according to a dynamic lighting mode but without departing from the context of the invention it is possible to provide that the selection of the dynamic or static lighting mode is carried out as a function of a manual trigger control and that the dynamic nature of the light beam emitted is programmed according to a predefined sequence and is not a function of the sound detected.

During this lighting process E3, a control step E4 is implemented for each of the control modules which are respectively associated with each luminous sub-assembly and which are configured to provide control commands to the luminous sub-assembly which it controls, and in particular commands for illuminating and/or extinguishing light sources and operating commands for the intensity and/or color of these light sources and/or operating commands for an associated optical element, for example the orientation of a reflector to modify the projection zone of the light beam.

The selection of the luminous sub-assemblies to which the control commands may be provided may, in particular, take into account the results of a selection step E5 of the lighting zone.

In the case where the control for implementing an interior lighting system according to the invention is manual, the system may be configured to detect in which zone of the vehicle the manual control has taken place and to target the lighting zone as a function of this previous detection.

In the case where the control for implementing the interior lighting system is automatic, the system is configured so that all of the control modules may simultaneously control the associated luminous sub-assembly thereof in an interior lighting dynamic mode. The system may also be configured so that the control modules control each of the luminous sub-assemblies in a coordinated manner, i.e. each luminous sub-assembly is able to emit a light signal which is different so as to form coherent overall lighting relative to the music detected when it is desired to implement this lighting in order to overlap a plurality of zones of the vehicle or, as a variant, so that the control modules control each of the luminous sub-assemblies independently.

If required, a central control member 34 is configured to receive the information collected in steps E1, E2 and E5 to define the corresponding control commands of each of the control modules 26 associated with the luminous sub-assemblies 16.

In a further step of the method E6, called the step of collecting information on the status of the vehicle in autonomous driving or manual driving, the control modules are configured to receive in real time, or at least with each change of state, status information 13 from the autonomous driving module indicating if the autonomous vehicle is in an autonomous or manual driving mode.

In a subsequent step of the method E7, each control module is thus configured so that, as a function of its position in a front part or a rear part of the passenger compartment, i.e. a part of the passenger compartment where the lighting is capable of being directly seen by the driver, the interior lighting dynamic mode is terminated when the control module receives information for passing to a manual driving mode.

The invention thus permits the passengers of a vehicle, and in particular an autonomous vehicle, to be provided with ambient lighting, i.e. dynamic lighting, the intensity, the color or even the orientation thereof being capable of being varied to follow the variations in music played in the passenger compartment or in a mobile device belonging to one of the passengers or variations of the visual appearance of scenes outside the vehicle, whilst respecting the safety conditions of driving when the vehicle is controlled manually, i.e. by providing static lighting which is constant over time in the part of the vehicle which the driver is able to see. The invention, however, is not limited to the means disclosed and the examples described and illustrated by the figures, and the invention extends to any combination of these means which is technically possible and to any means which are technically equivalent to the means disclosed and described here.

The invention claimed is:

1. Interior lighting system for an autonomous motor vehicle, comprising:
   at least one autonomous driving module; and
   an interior lighting luminous device including
      a plurality of luminous sub-assemblies, each luminous sub-assembly of the plurality of luminous sub-assemblies being configured in a static mode or in a dynamic mode, at least one luminous sub-assembly being configured to pass from the static mode to the dynamic mode, and vice versa, as a function of at least one autonomous driving control parameter from the at least one autonomous driving module and a position of the at least one luminous sub-assembly in the autonomous motor vehicle, wherein the at least one luminous sub-assembly is activated in the static mode in response to a detection of a switch to a manual driving mode and the at least one luminous sub-assembly is in a front part of a passenger compartment, and the at least one luminous sub-assembly is activated in the dynamic mode in response to a detection of an audio within the autonomous motor vehicle and the autonomous motor vehicle is in an autonomous driving mode.

2. The interior lighting system according to claim 1, wherein each luminous sub-assembly is controlled by a control module which is configured to receive the at least one autonomous driving control parameter from the at least one autonomous driving module and to define the dynamic mode or the static mode of a corresponding luminous sub-assembly.

3. The interior lighting system according to claim 1, wherein the at least one luminous sub-assembly of the plurality of luminous sub-assemblies is configured, in the dynamic mode, to diffuse an ambient light, an intensity and/or a color and/or an orientation thereof varying as a function of a control command relative to an audible element.

4. The interior lighting system according to claim 1 wherein the at least one luminous sub-assembly is configured, in the dynamic mode, to diffuse an ambient light, an intensity and/or a color and/or an orientation thereof varying as a function of a control command relative to a visual element.

5. The interior lighting system according to claim 2, wherein the at least one luminous sub-assembly is controlled automatically as a function of detecting information received by the control module.

6. The interior lighting system according to claim 1, wherein the at least one luminous sub-assembly is controlled by an action of a manual control.

7. The interior lighting system according to claim 1, wherein the at least one luminous sub-assembly comprises one or more light sources and at least one optical element for forming light beams emitted by source (s).

8. The interior lighting system according to claim 7, wherein the source (s) and the at least one optical element of the at least one luminous sub-assembly are configured to produce a rear projection.

9. The interior lighting system according to claim 8, wherein the at least one optical element is a transparent or translucent glazed surface configured to emit light.

10. The interior lighting system according to claim 7, wherein the at least one optical element is positioned on a dashboard.

11. The interior lighting system according to claim 7, wherein the source (s) and the at least one optical element of the at least one luminous sub-assembly form part of a pico projector.

12. The interior lighting system according to claim 11, wherein the at least one optical element is configured to beam onto a projection zone.

13. The interior lighting system according to claim 12, wherein the projection zone is arranged on a different structural element of the passenger compartment from a surface where the at least one luminous sub-assembly emits light.

14. The interior lighting system according to claim 1, wherein at least one first luminous sub-assembly is arranged in a front part of the passenger compartment and in that at least one second luminous sub-assembly is arranged in a rear part of the passenger compartment.

15. The interior lighting system according to claim 14, wherein the at least one first luminous sub-assembly may be controlled independently of the at least second luminous sub-assembly.

16. Method for interior lighting of an autonomous motor vehicle, comprising:
   a step (E1) of selecting a lighting mode,
   a step (E2) of detecting an audio,
   a step (E5) of selecting a lighting zone,
   a step (E6) of collecting information on a status of the autonomous vehicle in autonomous or manual driving modes including a step (E7) of configuring one or more luminous sub-assemblies associated with the lighting zone as a function of the lighting mode, a driving mode, and a location of the lighting zone, wherein the one or more luminous sub-assemblies are activated in a static mode when the autonomous motor vehicle is in a manual driving mode and the lighting zone is in a front part of a passenger component and activated in a dynamic mode when an audio within the autonomous motor vehicle is detected and the autonomous motor vehicle is in an autonomous driving mode.

17. Method for interior lighting of an autonomous motor vehicle comprising:
   activating a first luminous sub-assembly in a static mode in response to detecting a switch to a manual driving mode from an autonomous driving mode; and
   activating a second luminous sub-assembly in a dynamic mode in response to detecting the switch when the second luminous sub-assembly is in the dynamic mode prior to the switch,
   wherein the first luminous sub-assembly is placed in a front compartment of the autonomous motor vehicle and the second luminous sub-assembly is placed in a rear compartment of the autonomous motor vehicle.

18. The interior lighting system according to claim 2, wherein at least one luminous sub-assembly is configured, in the dynamic mode, to diffuse an ambient light, an intensity and/or a color and/or an orientation thereof varying as a function of a control command relative to an audible element.

19. The interior lighting system according to claim 2, wherein at least one luminous sub-assembly is configured, in the dynamic mode, to diffuse an ambient light, an intensity and/or a color and/or an orientation thereof varying as a function of a control command relative to a visual element.

20. The interior lighting system according to claim 3, wherein at least one luminous sub-assembly is controlled automatically as a function of detecting information received by the control module.

* * * * *